United States Patent [19]

Minoshima

[11] 3,980,248

[45] Sept. 14, 1976

[54] MANUFACTURING METHOD FOR THERMOPLASTICS

[76] Inventor: Manji Minoshima, 1-989 Nagara, Gifu, Gifu, Japan

[22] Filed: May 7, 1975

[21] Appl. No.: 575,388

Related U.S. Application Data

[63] Continuation-in-part of Ser. No. 365,604, May 31, 1973, abandoned.

[30] Foreign Application Priority Data

June 7, 1972 Japan.................................. 47-57471

[52] U.S. Cl................................ 242/118.7; 29/207; 29/DIG. 48; 156/73.5; 156/306; 228/2; 264/68
[51] Int. Cl.²......................................... B65H 75/14
[58] Field of Search.......... 29/200 R, 207, DIG. 48; 264/68, 248; 156/73.5, 306; 242/118.4, 118.7

[56] References Cited
UNITED STATES PATENTS

| | | |
|---|---|---|
| 3,501,110 | 3/1970 | Hopgood et al. .................... 264/68 |
| 3,562,078 | 2/1971 | Zumstein ........................... 156/73.5 |
| 3,720,993 | 3/1973 | Farmer et al. ..................... 156/73.5 |
| 3,749,298 | 7/1973 | Hasoi................................. 156/73.5 |
| 3,780,422 | 12/1973 | Herman ............................. 156/73.5 |

*Primary Examiner*—Edward G. Whitby
*Attorney, Agent, or Firm*—Otto John Munz

[57] ABSTRACT

The present invention relates to a method for manufacturing component thermoplastic sections and for joining them into bobbins for spinning and twisting machines. A frictional surface is formed by injection molding at the outer end surface of a male section and the inner end surface of a female section of a bobbin. By joining the sections and subjecting them to a high-speed rotation relative to each other the frictional surfaces melt and the sections are fused into an integral break resistant bobbin. The specific shapes of the male and female contacting surfaces and the manner of fusing them together are described as being critical.

20 Claims, 13 Drawing Figures

MANUFACTURING METHOD FOR THERMOPLASTICS

CROSSREFERENCE TO RELATED APPLICATIONS

This application is a continuation-in-part application of co-pending patent application Ser. No. 365,604, filed May 31, 1973 now abandoned by same Applicant, and the filing dates thereof and of Japanese patent application Ser. No. 47-57471, filed June 7, 1972, are being claimed.

BACKGROUND OF THE INVENTION

The bobbins of the prior art made of wood, metal and plastics fail to assure the dynamic balance and resistance to the initial shocks and twisting forces imposed upon them by the yarn wound around them.

Thus the prior art failed to solve the many problems in forming a dimensionally precise bobbin of uniform thickness, correct dimensions and stability and high impact strength and at low costs. This is particularly true, when a big size bobbin having a flange of 9 inch diameter and a body part of 20 inch traverse is being employed. An extraordinary large size mold pattern is required for forming it integrally, using a split pattern.

The most advanced prior art employing plastics in component sections and joining them by frictional melting is disclosed in U.S. Pat. No. 3,501,110 and this invention is a substantial improvement thereover.

SUMMARY OF THE INVENTION

The objects of the invention are to provide a method for the fabrication of a bobbin: which will avoid the defects of the prior art;

which will result in a bobbin of improved qualities, such as having initial shock resistance, resistance to the destructive forces of rotation during and after production thereof, and to those imposed upon the bobbin by the tangential force of the twisting yarn wound thereon during high speed rotation employed by the modern technology;

which will impart to the finished bobbin uniform strength, a high impact strength, stability and dynamic balance, permit mass production and reduce the manufacturing costs thereof, even when a large size bobbin with a flange diameter of 9 inches with a traverse of its body of 20 inches is produced;

made of component sections permitting the construction of the bobbin aforesaid and to provide the machinery necessary to combine such sections into such a bobbin.

Other objects of the invention and many of its advantages will become apparent to those skilled in the art from the following description taken in connection with the appended drawings.

BRIEF DESCRIPTION OF THE DRAWINGS

In the drawings same reference numerals and characters denote the same or equivalent parts.

FIG. 1A is the lower section of the bobbin when after assembly it is vertically attached to the machinery, FIG. 1B is the central section of the bobbin and FIG. 1C is the upper section thereof.

FIGS. 1A, 1B, 1C, 2, 3, 4, 6 and 7 are approximately to scale except as explained hereinafter.

DETAILED DESCRIPTION OF THE INVENTION

In manufacturing a bobbin of the invention for spinning and twisting machines the following subject matters are involved and described hereinafter:

a process for forming the bobbin sections;

a device for combining the respective sections; and a process for manufacturing the bobbin itself.

Comparative test results are recited.

The invention is not limited to the method of fabricating a bobbin, but may be employed in the fabrication of other tubular bodies as well.

While the invention will be described by way of an embodiment having a three-section assembly, two or more sections may be combined instead.

DESIGN OF THE COMPONENT BOBBIN SECTIONS

The three component sections of the bobbin are a central section 2, provided at each end with a male sex end, and two identical female flanged sections, a first flanged section 1 and a second flanged section 3, both provided with female ends, which in assembly mate with the ends of the central section.

For forming of the respective sections preferably a metal mold of a take-out type commonly used for injection molding is employed. The metal mold is divided into three sections and the forming is performed for each section separately.

Figure 6:
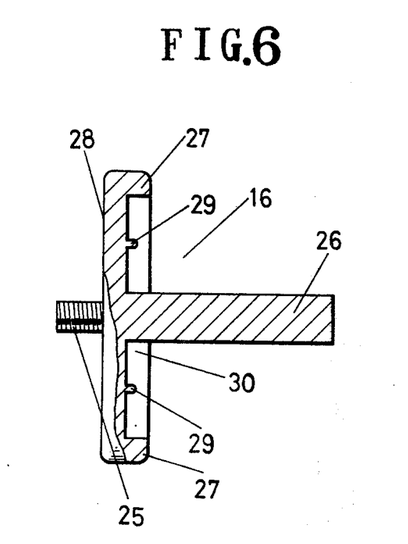
FIGS. 6 and 7 are sectional views showing holders for sections 1 and 2 respectively.

As shown on FIGS. 1A, 1C, 2 and 4 the cylindrical sections 1 and 3 are provided each with a flange 4 having means to connect the flange with a holder shown on FIG. 6. For this purpose small holes 5 are provided on the outside of the flange 4 for future insertion of pins 29 shown on FIG. 6 to mate with the holes. A narrow and long groove might be formed in lieu of the foregoing small holes 5, to mate with a corresponding protrusion on the holder 16. In the alternative to the holes the pins 29 or protrusion may be formed on the flange 4 and the small holes or groove on the holder 16.

For practical purposes it is necessary to have at least two holes and two pins.

A cylindrical hollow 6 is formed in the axial direction of the sections 1 and 3 in order to permit insertion and rotation of the bobbin after installation on the spinning and twisting machine into and on a support shaft 26 shown on FIG. 6. The diameter of the hollow 6 fits snugly over the outside diameter of the support shaft 26.

Figure 4:
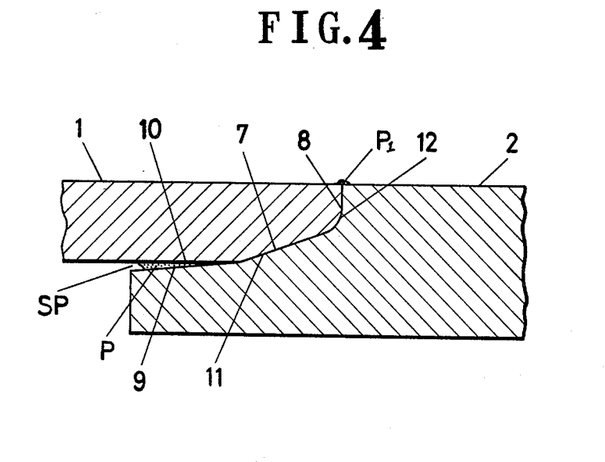
FIG. 4 is an enlarged sectional view showing the principal parts in assembly for the combining of the section 1 in FIG. 1A and the section 2 in FIG. 1B.

The male section and the female sections have the same outer diameters for axial assembly with a continuous cylindrical surface as shown on FIG. 4.

Figure 3:
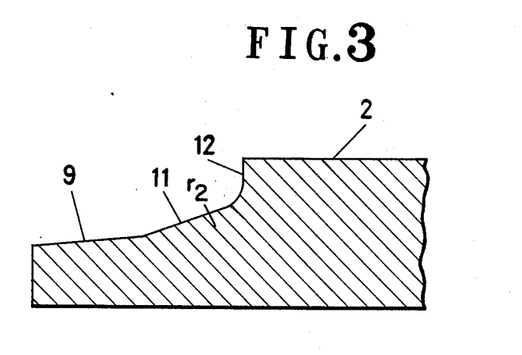
FIG. 3 is a partly enlarged sectional view of the opening of the section in FIG. 1B.

The thickness $t1$ of the tubular wall of the male sections is substantially greater than the thickness $t2$ of the female sections. The thickness of the tubular wall of FIG. 3 is up to about 2 m/m in excess of the thickness of the tubular wall of FIG. 2 to form the pocket SP. Each of the flanged sections has an outer shoulder 8 running perpendicularly to the wall thereof from its surface toward its longitudinal axis to a distance $t3$ of about one half of the thickness of the wall of the male section to form an inner radial edge $r1$ of said shoulder and to abut in assembly upon the corresponding outer shoulder 12 of the other section which has a corresponding inner radial edge $r2$.

The female section continues from the inner radial edge $r1$ of its shoulder rearwardly into its tubular inner surface 6a with frusto-conical hollow frictional surface 7 at a taper angle between about 20° to 45° from its linear axis to form with the inner surface 10 of its linear wall an obtuse angled edge $r3$.

The male sections have protruding frusto-conical surfaces continuing from the inner radial edge $r2$ of their shoulders toward the axis at a taper angle of between 20° to 45° to meet with the obtuse angled edge $r3$ of the male section in a radial inner edge junction and in intimate contact alignment with the frusto-conical projection of the male section in assembly.

The taper of the frictional surface 11 of the frusto-conical protrusion of the male section continues as a pocket side 9 from the said radial inner edge junction $r3$ at an angle between about 5° to 20° for a distance $t2$ equal to the thickness of the tubular wall of the female section, to form with the inner wall surface a of the female section upon assembly a frusto-conical pocket SP.

Thus by an axial frictional rotation of one section relative to the other, the surfaces 8 and 12 of the outer edges and the frusto-conical surfaces 7 and 11 melt and integrally fuse the two sections, with surplus thermoplastic P overflowing into the pocket SP.

The foregoing angles and the foregoing directions are important for the later combining of the sections, because, in the forming of the sections 2 and 3, gas would be completely evacuated at the point when plastics could be injected under high pressure and enter a cavity. If an angle of inclination of the rubbing surface 7 would be formed in the reverse direction, the plastics would be burned and the rubbing surface 7 could not be fully formed.

Figure 1A:
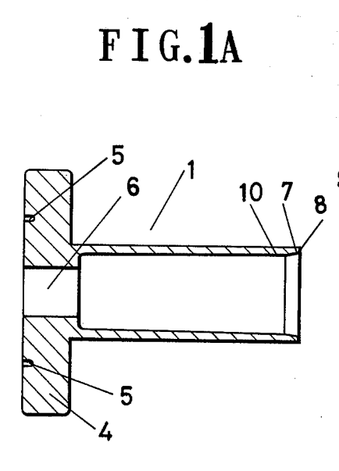
FIGS. 1A, 1B and 1C are longitudinal cross-sectional views of three complementary sections, preferably made by injection molding, for manufacturing a bobbin for spinning and twisting machines in accordance with the present invention.
Figure 1B:
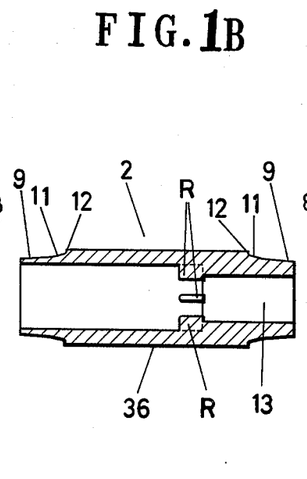
Figure 1C:
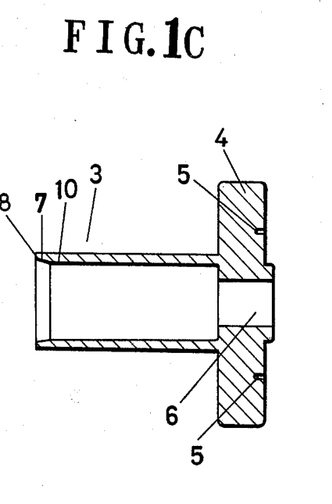
Figure 2:
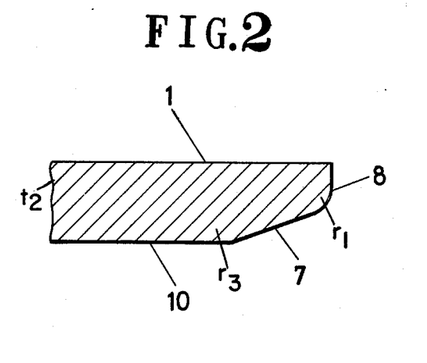
FIG. 2 is an enlarged sectional view of the openings of the sections in FIGS. 1A and 1C respectively.

The shoulders 8 are of substantial thickness of up to about ⅓ of the thickness of the cylindrical wall and end in the periphery R, shown on FIG. 1B.

The distance between the frictional surface 7 of sections 1 and 3 and the hollow 6 on the side of the flange is greater than the diameter of the hollow 6. The interior part of the surface 7 is tapered with a moderate inclination in order to guide the insertion of the overlapping surface 9 of the central section. The said overlapping guide surface must be at least of the same length as the length of the inserting guide surface 9 or the central section.

As shown on FIGS. 1B, 3 and 4 the middle section 2 between the sections 1 and 3 is cylindrical without a flange and on the example shown it is one of the components which is not to be rotated.

On the outer circumferences of the opening on each side are provided the frictional surface 11 and the shoulder 12 mating respectively with the rubbing surfaces 7 and the end edge 8 of the flange sections 1 and 3 respectively. The angle of the frictional surfaces 11 of the sections 1 and 3 also is critical and it is necessary that the said angle is between about 20° and 45° in conformance with the taper angle of the female sections. Moreover, the radius of the R-section of the shoulder 12 conforms with that of the shoulder 8 of sections 1 and 3 and their R-section. As shown in detail of FIGS. 3 and 4 the surface 11 of the central section continues into the leading or inserting guide surface 9 having a taper angle between 5° to 20° to the axis, which is smaller than the angles of sections 1 and 2. the frusto-conical surface 9 forms with the overlapping guide surface 10 of sections 1 and 3 the obtuse angled pocket side for the pocket SP and inclines inwardly from the inside in a taper shape away from the overlapping guide surface 10 thus creating the pocket space SP.

As shown on FIG. 4 when section 2 is combined with sections 1 and 3 respectively, the frictional surfaces 7 and 11 are in alignment and forcefully come into contact under pressure, to be melted and fused by the frictional heat portion of the melted plastics P which overflows into and in slight amounts also between the surfaces 9 and 10. The pocket SP is provided to receive and retain this portion of the plastic overflow to strengthen the formed joint.

The melted plastic P adheres uniformly to the interior of the space SP without solidifying on the interior part thereof due to the rotation of the section 1. Therefore, a product is obtained which has a good balance.

The dimensions of the spaces SP are calculated to have a capacity sufficient to receive the overflow amount of the melted plastic.

The taper degree of between about 20° to 45° is proportioned to the thickness of the tubular wall of 10 mm to 3 mm respectively.

Figure 10:
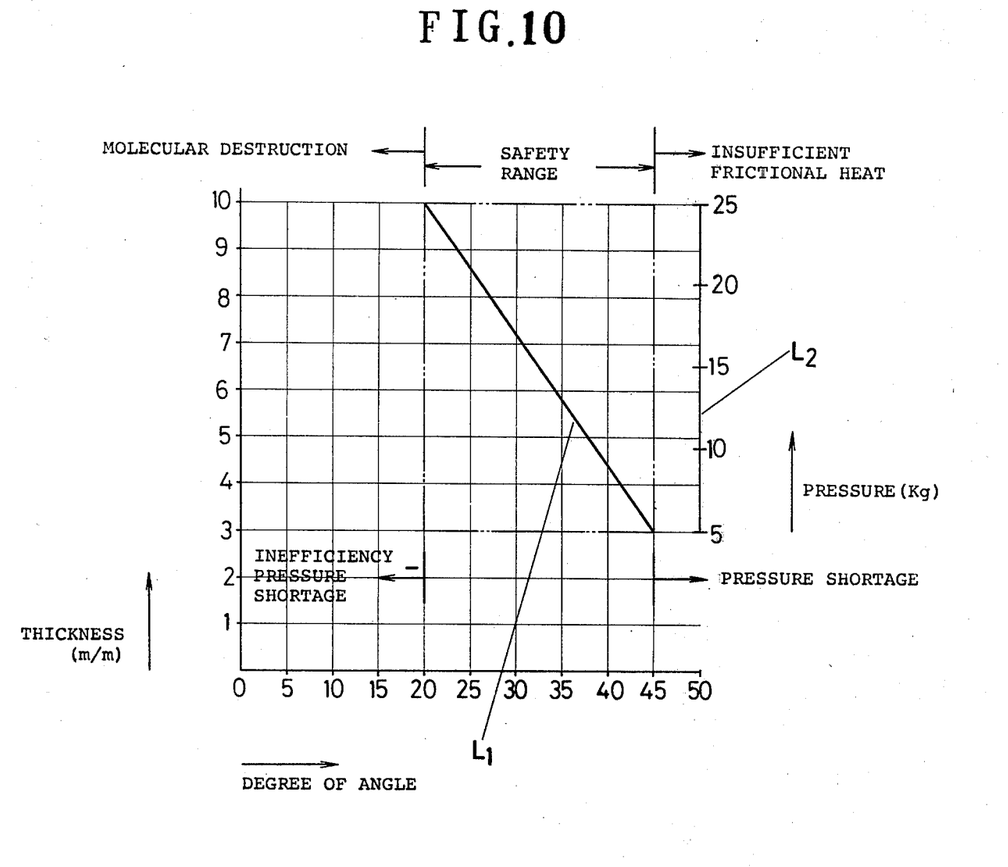
FIG. 10 is the graphic representation of the relationships between the taper degrees and thicknesses of the walls of the sections critical for optimum frictional fusion thereof.

The relationship between the taper angle of 20° to 45° and the thickness of the tubular wall of the three sections 1, 2 and 3 is graphically represented on FIG. 10 which depicts the criteria for frictional heat and fusion of the thermoplastic joints of the sections. It indicates that when the thickness is 10 mm, the angle of 20° is adequate and, also, when the said thickness is 3 mm, the angle of 45° is adequate, when the thickness is halfway between them, for instance 7 mm, the angle of about 31° is adequate.

This relationship between the angle of the taper and the thickness of the wall is related to a fusing speed of 2 mm to 5 mm/sec. of the oil pressure cylinder and 500 m to 300 m/min. of the circumferential speed. Therefore, if this relationship substantially deviates from the first base line $L_1$ shown in FIG. 10, fusing by a frictional heat becomes impossible due to an insufficient pressure.

The relationship between the thickness of the wall and pressure is illustrated with reference to the second base line $L_2$ shown in FIG. 10 and indicates that when the thickness is 10 mm, a pressure of 25 kg is to be applied with the taper angle of 20°. For a thickness of 3 mm a pressure of 5 kg should be added for a taper angle of 45°. Thus when the wall thickness is 7 mm, an angle of about 31° and the pressure of about a little under 17 kg are adequate.

It is important to have the angle 5° to 20° provided on the surface 9, so that the pocket SP shown in FIG. 4 is disposed between the interior sides of the sections 1 and 2 for receiving the surplus thermoplastic P which melts and flows out at the time of fusion.

Figure 11:
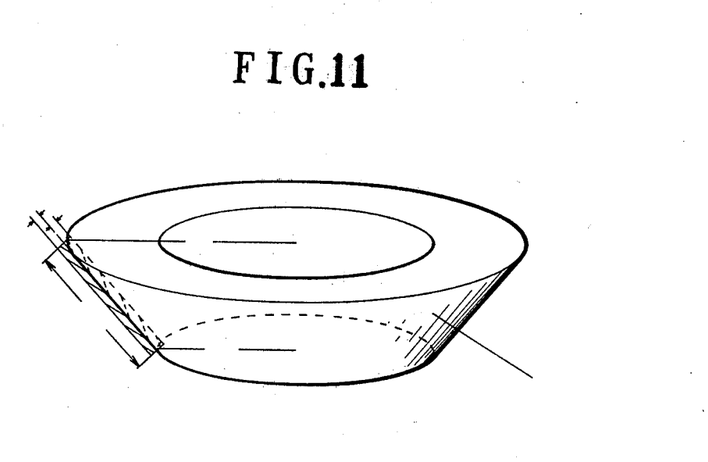
FIG. 11 is a perspective view showing the relationship between the taper angle and wall thickness of a right conical frustum of a section.

Further, it is necessary to have the volume of the surplus thermoplastic P approximately coincide with the volume of the pocket SP which can be generally calculated by the equation shown on FIG. 11, $V = 2XtXS = 2Xt X\mu(R+r)G = 2\mu(R+r)GXt$ where $S$ is the circumferential area of right conical frustum, $R$ is the radius of large circle, $r$ is the radius of small circle, $G$ is the length of generating line, $t$ is the fusion thickness (one side) and $V$ is the total volume of fusion.

This equation serves to find an approximate value neglecting the radial edges $r1$ and $r2$ of the sections 1 and 2. S in this equation denotes the surface 11 of section 2 and the fusion thickness on the surface 7 of section 1.

By making the volume of the surplus thermoplastic P approximately coincide with that of the pocket SP, the surplus thermoplastic P is cooled off and solidified within the pocket SP without any local solidification and adherence in order to assure a good dynamic balance for a bobbin. In practice the pocket SP is arranged by placing the surface 9 at the surface angle of usually about 5°. When, however, the outside diameter is 55 m/m for the section 2 and the thickness is 8 mm for the same, this angle must be under 5° to prevent passing of the surplus thermoplastic P out of the pocket SP before it solidifies. Otherwise a good dynamic balance could not be acquired, because the surplus thermoplastic would flow out and solidify in the space away from the guide surface 10 of the section 1.

The radial edges $r_1$ and $r_2$ symmetrically shaped at the edge of each section are desirable. When, for instance sections 1 and 2 are to be combined, section 2 is pressed against section 1 by adding pressure, but the surfaces 7 and 11 being inclined, section 2 is apt to slip outwardly along the inclined angle of the surface 7 of section 1. Consequently, a friction necessary and sufficient for the fusing on the outer circumferential edges of the surfaces 7 and 11 otherwise may not be obtained and a creep could be produced so that molecules of the outer circumferential edge of the surfaces 7 and 11 would be damaged, destroyed and whitened.

Therefore by providing the radial edges $r_1$ and $r_2$, a frictional heat necessary for fusing can be produced also at the outer circumferential edge.

Figure 7:
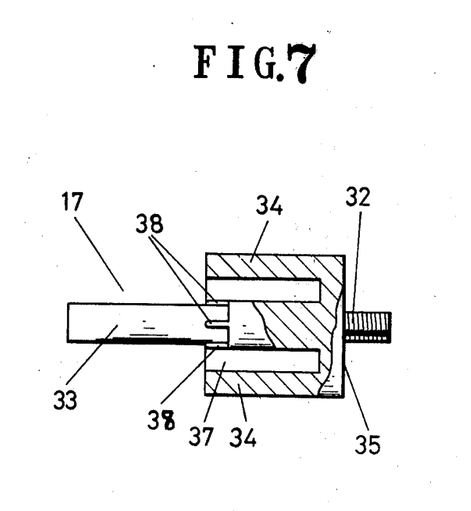

A cylindrical hollow part 13 is formed inside of the section 2, but, at least, one of the sides is provided with an inside diameter mating with the outside diameter of a support shaft 33 described with reference to FIG. 7. The interior of the hollow part 13 is provided with a plurality of ribs R which are formed in the axial direction of the hollow 13. The rib R preferably is lengthened, to reinforce the bobbin, and to counteract intermittent increased forces thereon. The central section 2 is thicker than the sections 1 and 3. Sections 1, 2 and 3 are formed by injection molding without any difficulties even for a large size bobbin with a flange diameter of 9 inches and a body traverse of 20 inches. While the number of sections here illustrated is three, it is possible to manufacture the bobbin in two sections 1 and 3 only, by lengthening the one with a male end and the other with a female end by omitting the middle section.

It is also feasible to increase the number of sections to more than three pieces to further strengthen the bobbins when an increase in forces on the operating bobbin is expected and an increase in the manufacturing process and in the production cost is not to be taken into consideration.

After combining sections 1, 2 and 3, they are subjected to scrubbing steps in an annealing step, such as by a heat treatment, a turning step by a jig inserted into the hollow part of the respective sections 1, 2 and 3 and by a stripping step by a lathe to strip the bobbin of any excess plastic.

In order to prevent deviations in the outside circumference of the flanges 4, the configuration and dimensions of the flanges 4 are brought into correct conditions.

By a cutting step the surfaces of the hollow parts 6 and 13 of the respective sections are processed by a cutter within a tolerance of $\pm 15 \mu$, whereby the deviations are decreased to within $20 \mu$ to a high precision of the finished bobbin.

The sections are preferably produced in toto from thermoplastic materials selected from a group consisting of polyamides, polyacetals, polyesters, polypropylene and polystyrene.

It is, however, feasible and comes within the scope of the invention to utilize these plastics in the fabrication of the respective sex ends of the sections only, which ends in such an instance may be integrally joined with other conventional and cheaper materials of the prior art in the manufacture of a bobbin. However, materials having moisture absorption properties must be avoided to maintain the dimensional stability and dynamic balance of the bobbin. The inventor discovered that for the same reason about 20% to 50%, preferably 20% to 25% of glass fibers must be mixed into the thermoplastic material, the upper limit thereof being dictated by the discovery that it is chemically difficult to increase the amount of glass fiber in excess of 50% and the strength of the glass fiber must not be affected by the fusing temperature f.i. of the polyamide. Preferably nylon is used. The glass fiber prevents water absorption. The inventor discovered that if less than 20% of glass fiber is added, the impact resistance and strength of the bobbin is seriously reduced.

The bobbin sections combining apparatus.

Next, illustrations are shown for a construction of the device which is eventually needed for combining three sections 1, 2 and 3. For briefly explaining a combining device M, the said device M is constructed in such a way that when the sections 1 and 2 are to be combined, eitherone of the said sections is made to rotate and the section which does not rotate is pushed by pressure onto the rotating section and, by producing exothermic phenomena on the rubbing surface of both sections, an end edge of plastic is utilized for producing heat for melting. Of course, the combining could be done by rotating the sections either in the same direction with the one section at a high speed and another section at a low speed or in the opposite direction for both of the said sections, however, this would make the construction of the device M complicated and easily produce deformations at the center of the sections. Since the section used for the bobbin in the present invention is made of thermoplastic and it would be surely melted at a comparatively low melting temperature even when glass fiber is mixed into it, therefore, a melting could be fully accomplished by only rotating one of the sections.

At the one side of the combining device M there is provided a motor 14 for rotating a section on the one side, a clutch 15 for transmitting and stopping a rotational force and the holder 16 to support the section. On the other hand, there is provided a spindle 18 with a holder 17 for an additional section which makes the additional section move back and forth towards the said holder 16 without rotating and remaining in a fixed position, and also provides an advancing piston rod 19 for giving pressure and a forward movement to said spindle 18 and the additional rod 20 for withdrawing said spindle 18.

These items the clutch 15, the spindle 18, the advancing piston rod 19 and the withdrawing rod 20 are so constructed that they are electrically connected respectively and started and stopped either automatically or manually.

To explain in detail the combining device hereinafter, the motor 14 that is connected with a main switch $S_1$ is mounted on a table 21 and a gearbox 22 is connected to the inside of said motor 14. The gearbox 22 is to change a melting temperature by changing the number of revolutions depending upon the size of the section of the kind of materials. The clutch 15 is provided at the inner side of a shaft 23 of the gearbox 22 to give a rotational force to a driving spindle 24 or to stop the rotation. The structure of the clutch 15 is well known, therefore, it is shown in a block drawing, however, its function could be sufficiently fulfilled by, for instance, adopting an electromagnetic clutch.

The driving spindle 24 is installed at the inner side of the clutch 15 and, further, the holder 16 for the rotating section is detachably installed by screws and the like so as not to become eccentric. If, for instance, it is explained by taking the holder 16 which supports the section 1, a bolt 25 is projected, as shown in FIG. 6, to coincide with a screw hole (not shown) of the driving spindle 24, and on the opposite side of the bolt 25, a supporting axis 26 is provided to coincide with the diameter of the hollow part 6 of the section 1, and, also, between the bolt 25 and the supporting axis 26, a disc member 28 is provided with a guide 27 projected in the same direction as the support axis 26 projects, and, then, on the inner part of the member 28, a plurality of pins 29 is projected to coincide with the size and the number of the foregoing small holes 5, that are provided on the section 1. The shape and the size of recess 30 located inside of the guide 27 are made to coincide with the flange 4 of the section 1. That is, when the section 1 is rotated, a torsional moment acts on the flange 4 of the section 1 by only inserting the pin 29 into the small holes 5, therefore in order to prevent this, the recess 30 and the guide 27 are dispensable for securely supporting the flange 4. It is necessary to have various kinds of holders 16 to fit the size and the shape of the section 1. For this, the holder 16 is so constructed that it is detachable from the driving spindle 24. For instance, in case the diameter of the flange is large or the small holes provided on the flange is located differently from the location of the small holes 5 of the section 1, other different holders would be attached to the driving spindle 24 for this purpose. On the opposite side to the foregoing motor 14 a spindle 18 is installed to move back and forth without making any eccentricity through the well known member 31.

At the tip end on the side of the motor of the spindle 18 a screw hole, which is not illustrated here, is provided and a holder 17 for supporting the additional section is provided detachably without making any eccentricity just the same as the foregoing holder. For instance, as explained for the holder 17 which supports section 2, its sectional configuration is, as shown in FIG. 7, such that a bolt 32 is projected to meet a screw hole provided at the tip end of the spindle 18 and, on the opposite side of the bolt 32, a support axis 33 is provided to coincide with the diameter of the hollow part 13 of the section 2 and, then, between the bolt 32 and the support axis 33, a disc member 35 with the projection of a guide 34, whose length is somewhat longer than that of the guide 27, is provided, and, lastly a recess 37 is provided to meet with the body part 36 of the section 2 at the inner side of the member 35. A plurality of long and narrow rotation check pieces 38 that are projected on the circumference of the support axis 33 prevent rotation when the section 2 is inserted into the holder 17 and is provided so as to numerically coincide with the rib R of the section 2. The rib R and the rotation check pieces 38 would engage each other when the section 2 is inserted into the support axis 33. Of course, also for the holder 17, various kinds of holders could be attached depending on the shape and size of the section and the number of ribs just the same as in the case of the holder 16. For instance, in the case of section 2, if the shape and other factors of the section 2 are changed, a different holder would be prepared according to its changes. At the rear end of the spindle 18, a rod 19 is disposed to move back and forth in the right angle direction of the spindle 18 and the spindle 18 respectively in order to give an advance movement and a pressure onto the spindle 18. That is, the advance movement is necessary when the holder 17 is going to be moved towards the holder 16 on the side of the motor 14 and it is necessary for the spindle 18 to move backwards to separate the sections, which have been combined, from the holder 17 after combining the two sections 1 and 2. Consequently, for the withdrawal of the spindle 18, a different rod 20 is installed to the spindle 18 so as to move back and forth in coordination with the spindle 18 by the well-known member 39.

Also, it is necessary to withdraw the rod 19 accompanying the withdrawal of the spindle 18, but, after the combining, the larger the size of the section is, the longer the withdrawal distance by the spindle 18 is. Therefore, the withdrawal distance by the rod 19 should be made longer also. However, if the withdrawal distance is made longer, deviation would easily occur, therefore, the withdrawal distance by the rod 19 is made shorter and the rod 19 is so provided that it would move back and forth on a rail 14 in the right angle direction to the axial line direction of the spindle 18 in order not to be a hindrance when the spindle 18 is withdrawing.

Moreover, a limit switch $S_3$ is installed to actuate an oil pressure regulator 41 for the piston rod 19. Namely, if explained for the rotating section 1 and the fixed section 2, when the section 2 inserted into the holder 17 is advanced to the section 1, its advancement could be made at a comparatively high speed and a pressure remaining at zero before both sections come into contact, as shown in FIG. 4. It is necessary to extremely slow down the advancing speed and, on the other hand, to add the pressure when the rubbing surfaces 7 and 11 of both sections start to come into contact. The reason for this is that the section 2 is fixed.

A melting temperature for the plastic could not be obtained by only making the rotating section come into contact, therefore, it is necessary to provide the required pressure mentioned hereinafter. Also, the combining point of the section 1 and the section 2 by melting is, as shown in FIG. 4, the rubbing surfaces 7 and 11 and the end edges 8 and 12 of the opening. Consequently, it is necessary to advance the section 2 with a moderate speed by subjecting it to a pressure for the distance until the end edges 8 and 12 of both openings come into contact. And when it advances the said distance, the spindle 18 should be stopped so as not to further advance and, on the other hand, it is so constructed that at the same time when the spindle 18 stops, the clutch 15 actuates to immediately stop section 1. Furthermore, when the pressure rapidly decreases, the combining or joining of sections 1 and 2 would not be sufficiently performed, therefore, it is so designed that the pressure would be maintained during a cooling hour during which the melted plastic will solidify.

The bobbin manufacturing method

Figure 5:
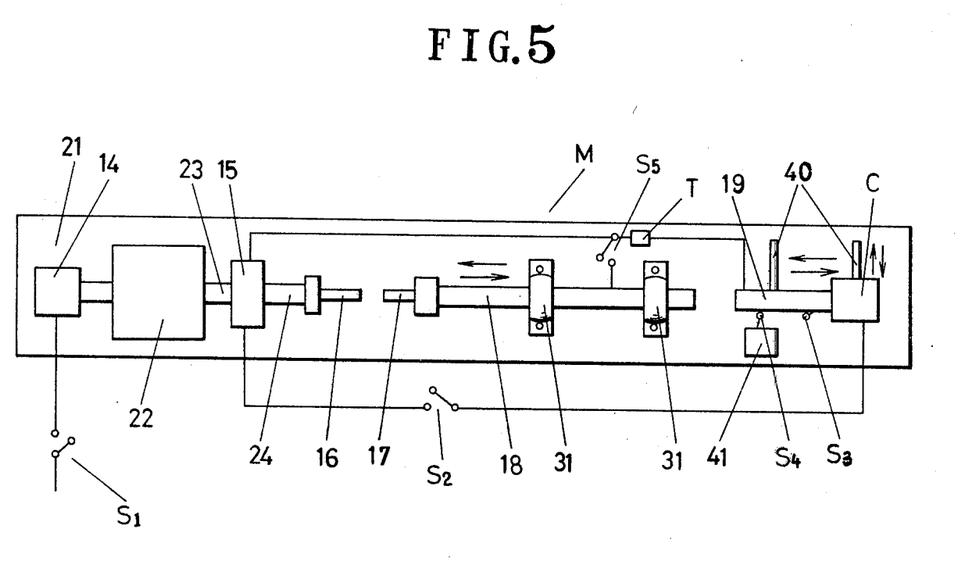
FIG. 5 is a schematic plan view of the apparatus used for combining the sections.

First, the flange 4 of section 1 is faced towards the member 28 of the holder 16 that is fixed on the driving spindle 24 as shown in FIGS. 5 and 6 and the hollow part 6 is inserted into the support axis 26, and, then the flange 4 is pressed into the recess 30 on the member 28 and, finally, by inserting the small holes 5 of section 1 into the pins 29, section 1 is securely supported on holder 16.

Then, with the same procedure as in section 1, section 2 is securely supported on the holder 17 that is fixed on the spindle 18 and a motor 14 is driven by actuating a main switch $S_1$. In this case, the number of revolutions by the driving spindle 24 differs depending on the size of section 1 and on its plastic material. However, for instance, in case of a polyamide material and an outside diameter under 65 m/m, the number of revolutions is previously set by the gearbox 22 to be between 1,700/r.p.m. to 2,700/r.p.m. and, also in case of the outside diameter of 66 m/m to 100 m/m, the number of revolutions is between 1,200/r.p.m. to 1,700/r.p.m. by the same handling as described above.

Then, a limit switch $S_2$, which is so connected to the clutch 15 and the rod 19 that it would actuate both of them simultaneously, is actuated. Thus, the rotational force by the motor 14 acts on section 1 through the clutch 15 and section 1 starts to rotate. On the other hand, the rod 19 would advance with a zero pressure and a comparatively high speed in order to make the spindle 18 advance without subjecting to the action by the oil pressure regulator 41. The advance movement would continue until the limit switch $S_3$ of the rod 19 and the limit switch $S_4$ of the oil pressure regulator 41, which are previously set, would actuate. That is, it would be until the rubbing surface 11 of the section 2 reaches the rubbing surface 7 of section 1. And, then when the limit switch $S_3$ of the piston rod 19, which is set to act simultaneously with the contacting of the rubbing surfaces 7 and 11 of both sections, is connected with the limit switch $S_4$ of the oil pressure regulator 41, the speed of the piston rod 19 is slowed down and, at the same time, by the action of the oil pressure regulator 41, a pressure is given to the piston rod 19. In case the sections 1 and 2 are of polyamide materials and the outside diameter is below 65 m/m, it is proper to make the said pressure ranging from 30 kg/cm$^2$ to 40 kg/cm$^2$ for a gauge pressure shown by the oil pressure, and in case of 66 m/m to 100 m/m, it should be 15 kg/cm$^2$ to 30 kg/cm$^2$ and section 2 advances towards section 1 with a moderate speed subjecting to the foregoing pressure, therefore, the rubbing surfaces 7 and 11 of both sections would come into contact to produce friction and, the, a melting heat for the plastic is easily produced then, as to begin to fuse both sections. Further, section 2 advances by the pressure, as shown in FIG. 4, over the distance within which the end edge of the opening of both sections come into contact, therefore, the rubbing surfaces 7 and 11 and the end edge of the openings 8 and 12 of both sections are completely fused and joined respectively.

At this moment, a small amount of the melted plastic P at the rubbing surfaces 7 and 11 flows into a space SP, as shown in FIG. 4, between the guide surfaces 10 and 9 on sections 1 and 2, however, since section 1 is still rotating, it would fill up the space SP uniformly.

Also, in the circumference of the end edges 8 and 12 of the opening of both sections 1 and 2 the melted plastic $P_1$ would not creep and only a little amount would bulge out.

Figure 8:
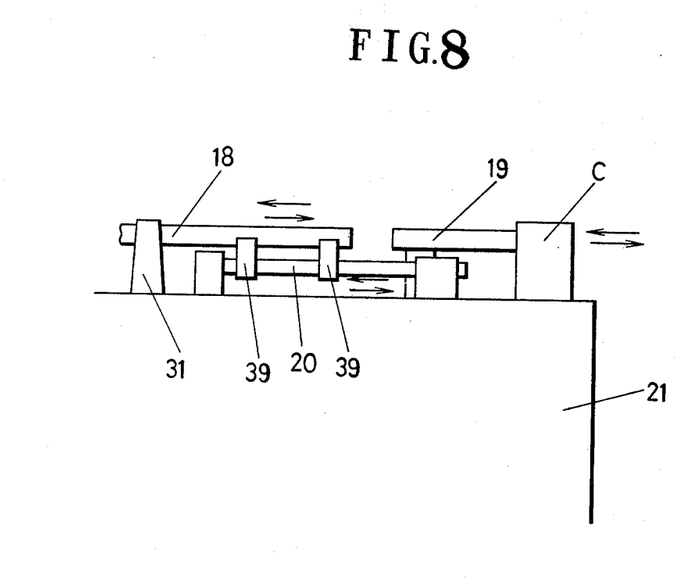
FIG. 8 is a schematic front view on FIG. 5.

When section 2 advances over the distance within which the end edge of the opening of both sections come into contact, a limit switch $S_5$ equipped with a timer T, which connects the spindle 18 with the piston rod 19 shown in FIG. 5, could be operated and the advancement by the piston rod 19 of an oil pressure cylinder C would be stopped and, at the same time, the actuation by the clutch 15 would be stopped. In this case, when the pressure is rapidly lowered, the combining of section 1 with section 2 could not be fully performed, therefore, the operation by the oil pressure regulator 41 should be continued as it is without stopping only for a cooling time and if, for instance, the cooling time of about 5 seconds lapsed, then, the foregoing timer T would be actuated to withdraw the spindle 18 by the action of a withdrawing rod 20 in FIG. 8. Also, the rod 19 would be withdrawn and when withdrawn for a definite distance, the rod 19 would be moved sideways to the spindle 18 along a rail 40 which is provided at a right angle thereto.

Thus, sections 1 and 2 are combined or joined, but, in this case, there would remain the section which is combined with either the holder 16 or the holder 17 in the foregoing process. In this instance, either one of the sections 1 and 2, which has a great contacting area with either the holder 16 or 17, would have a greater resistance, therefore, sections 1 and 2 which were combined on the side of the section of the greater resistance would remain. However, this is of no importance for the manufacturing process in either case, because it is only needed to take out the combined sections 1 and 2 from either the holder 16 or 17.

Now, it is the matter of the combining of the foregoing combined sections 1 and 2 with section 3 and, in this case, since the procedure would not be quite different fundamentally from the combining method for sections 1 and 2, it shall be omitted here, however, if the length of section 3 is shorter than that of the combined sections 1 and 2, it is better to attach section 3 to the side of the driving spindle 24 as shown in FIG. 5 and rotate the section 3. That is, the longer the rotating section is, the more liable the twisting moment is produced, therefore, it is necessary to fix a short section on the holder. Of course, as previously explained, in case section 3 is fixed on the side of the driving spindle 24, it is necessary to install on the driving spindle 24 a different holder (not illustrated) which fits to the shape of section 3 in lieu of the holder 16. Of course, a long section could be rotated, but it is needed to contrive not to produce any twisting moment.

Accordingly, by rotating the section 3 and fixing the previously combined sections 1 and 2 on the holder 18 the bobbin for spinning and twisting machines shall be obtained by the combining process described herein. As far as a tolerance of the inside diameter surface of the bobbin is concerned, it is within 20 μ as it is, therefore, no corrections would be necessary, however, since the outer circumference of the body still remains in its condition when formed, an error of 0.15 mm to 0.3 mm in the plastic contraction would appear. Moreover, the melted plastic $P_1$ at the time of the combining is bulged out and solidified around the outer circumference of the end edges 8 and 12 of the opening of sections 1, 2, and 3, therefore, in order to coincide with the tolerance of the inside diameter surface, it is necessary to correct so as to be within the tolerance of 20μ for straightness.

Figure 9:
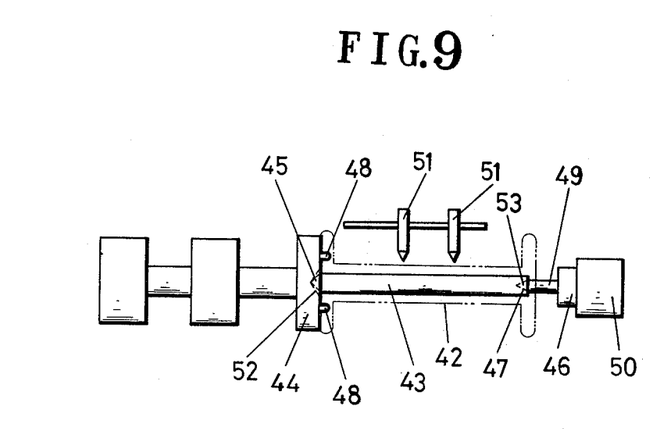
FIG. 9 is a schematic side view showing a finishing device.

It is better to perform the foregoing correction by the following device. That is, a shaft 43 which has a hole diameter 0.02 mm less than that of the bobbin 42 is prepared as shown in FIG. 9 and a projecting part 45 with a taper of about 60° is made at the side of a bearing 44 of the said shaft 43, and, on the other hand, at the side of a tail stock 46, a recessed part 47 with a taper of about 60° is made at the center of the shaft end and, then, on the bearing 44, pins 48 are provided so as to coincide with the small holes 5 on sections 1 and 3. A center bar 49 is provided to move back and forth and, also, rotatably to the tail stock 46 and connected with a motor 50. On the side of the shaft 43, a cutter 51 is disposed so as to face at a right angle to the shaft 43 and the said cutter 51 is so constructed that it could move back and forth and, also, left and right.

Now, by inserting the bobbin 42 into the shaft 43 and after placing the projecting part 45 of the shaft 43 to the recessed part 52 of the bearing 44, the small holes 5 of the flange 4 are inserted into the pins 48.

Next, the center bar 49 is advanced until the projecting part 53 of the center bar 49 come securely into contact with the recessed part 47 made at the center of the end of the shaft 43. And, then, by fixing the tail stock 46 and the center bar 49 and by rotating the motor 50, the cutter 51 is pressed against the outside circumference of the body of the bobbin 42. Thus, the outside circumference of the body of the bobbin 42 is finished up in the required form with a tolerance for the surface of the inside diameter which would be within 20 μ. For instance, in case of the bobbin with a weight of 1.5 kg, the dynamic balance would be within 1.5 g/cm and it appears that the sections 1, 2 and 3 are integrally formed.

The superiority of the present invention is demonstrated by comparative test results with the conventional type of the bobbins as shown on the following

COMPARISON TABLE

| | versus | |
|---|---|---|
| | Bobbin by present invention | Conventional type |
| Actual revolutions | 7,000 to 8,000 r.p.m. | 5,000 to 6,000 r.p.m. |
| Actual amplitude | under 30 μ | 30 to 128 μ |
| Noises estimated about | Half as much as prior art product | |
| Weight allowance | ± 5 g | ± 100 g |
| Tensil strength | 3,150 kg | 1,700 kg |
| Compressive force | 4,500 kg | 2,800 kg |
| Dynamic balance | 1.5 g/cm | 3 g/cm |
| Body deviation | Below 0.1 | 0.1 to 0.15 |
| Tolerance for hole diameter | ± 15 μ | ± 50 μ |

Notes:
Data were taken for 6'' (flange diameter) × 14''(body traverse) bobbin as its standard.

The other effectiveness of the present invention would be clear by referring to the preceding paragraphs in which the construction of the section, the construction of the device and the manufacturing process are described.

The configuration of surfaces 7, 8 and 10 on sections 1 and 9; 11 and 12 on section 2 shown in FIG. 4 is a critical feature of this invention since it had been found that other configurations do come apart in actual use.

The following examples illustrate this important feature of the invention:

In a first test ends of sections to be joined were simply tapered into male and female shapes with the angle of the tapered surface being 30°. Then, using a polyamide thermoplastic which was mixed with 30% glass fiber and the outside diameter of a section body made 65 m/m, only one section was rotated at 1,700/r.p.m. and the tapered end of the other non-revolving section was contacted with the former, but the expected fusing temperature was not obtained and both sections only vibrated with each other. However, it was discovered, upon giving a pressure of the gauge pressure by the oil pressure 15 kg/cm² to the non-revolving section and contacting the ends of both sections with each other, that most of both of the tapered male and female end surfaces had melted and fused together.

However, it was found that, on the circumferential end edge of both ends, a creep was produced with no sufficient fusion being accomplished therearound.

In a second test, the configuration of the end of the section was changed by making one end into the shape of a frustum projection and the second end in the shape of a matching frustum shaped knotch to receive said projection.

Then, upon trying to fuse under the same conditions as described in the first test, both sections were so poorly fused that when a sufficient fusing of the outside end edge of both sections was tried, the projection end and the knotched end were very poorly fused together and, on the other hand, when a sufficient fusing of the projection and the knotch was obtained, the remainder of the outside end of both sections was poorly fused which resulted in an unsatisfactory bond.

In a third test the configuration of the section end was further improved to make it similar to the shape shown in FIG. 4 except that surface 9 was parallel with surface 10. A substantially small radius was formed at the outside edge of the tapered end of both sections. The angle of the tapered surfaces was 30°. Then, upon trying to fuse the rubbing surfaces under the same conditions described in the first test, no creep occurred at the outside edge of the end as shown in the first case with the outside edge of the said end being sufficiently fused. However, fused plastic scattered disorderly about into the inner surface of the female section near the inner edge of the male section and a satisfactory dynamic balance was not obtained for the joined product.

In the fourth test we tested the article of the present invention. Namely, a tapered surface 9 (in FIG. 4) which has a slower taper than the tapered male surface was outwardly extended on the extension of the said tapered male rubbing surface so as to form a space between the inner surface of the female section and the extended tapered surface of the male section. The volume of the space is equivalent to the volume of melted plastics which flowed out during the melting step. Under the conditions described above and the same conditions used in the first test, a satisfactory bobbin which had structural stability and good dynamic balance was obtained after the fusing step. The inventor owes the discovery of this improved result to experiments on about 3,000 bobbin samples. In the foregoing the description was made using rubbing surfaces having a 30° angle, but the optimum angle changes with the size and thickness of the section. That is, when the thickness of the section is thin, a great angle of the end can not be used and, on the other hand, when the thickness of the section is thick, a comparatively great angle of the end can be employed and it was proved by the experimentation that it is desirable to have a range of the said angle from 20° to 45°.

What is claimed is:

1. A method for integrally joining tubular bodies such as for manufacturing bobbins for spinning and twisting machines comprising the steps of:

fabricating two differently shaped component bodies, each having at least one tubular mating male and female-end section, respectively, of thermoplastic material with the female end section of one to mate with the male end section of the other body in a linear coaxial body alignment at a common radial junction;

said male section and said female section having the same outer diameters for axial assembly with a continuous cylindrical surface;

the thickness of the tubular wall of the male section being substantially larger than that of said female section;

the end sections having an outer shoulder running at an angle to the wall thereof from its surface toward its longitudinal axis to a distance of about one half of the thickness of the wall of the male section to form symmetrically shaped inner radial frictional edges of said shoulders abutting in assembly upon each other in alignment in intimate contact with each other;

the female section continuing from the inner radial edge of said shoulder rearwardly into its tubular inner surface with a frusto-conical hollow surface at an acute taper angle to form with the inner surface of its linear wall a corresponding obtuse angled edge;

the male section having a frusto-conical surface protrusion continuing from the inner radial edge of said shoulder toward its axis at an acute taper angle same as that of the frusto-conical surface of the female section to meet with the said obtuse angled edge of said male section in said radial inner edge junction and in an intimate contact alignment with the frusto-conical projection of said male section in assembly;

the taper of the frusto-conical protrusion of said male section continuing as a pocket side from the said radial inner edge junction at an acute pocket-angle for a distance about equal to the thickness of the tubular wall of the female section, to form with the inner wall surface of the female section upon assembly a radial pocket, whereby on axial frictional rotation of one section relative to the other the surfaces of the radial edges and of the frusto-conical surfaces melt and integrally fuse said sections, with surplus thermoplastic material overflowing into said pocket.

2. A method for integrally joining tubular bodies as claimed in claim 1,
the said angle of the outer shoulders to the surfaces of the said sections being about 90°.

3. A method for integrally joining tubular bodies as claimed in claim 1,
said acute tapers angles of the frusto-conical hollow surfaces of the female and male sections being between about 20° to 45° in proportions to the thickness of the wall of about 20 mm to 3 mm respectively,
a pressure of between about 25 kg to 5 kg respectively, at a fusing speed of about 2 mm to 5 mm/sec. and at circumferential speed of about 500 m to 300 m/min.

4. A method for integrally joining tubular bodies as claimed in claim 1,
said acute pocket-angle being between from below 5° up to about 20°.

5. A method for integrally joining tubular bodies as claimed in claim 1,
said acute pocket angle being below 5° when the diameter of the cylindrical middle section without a flange is 55 m/m at the thickness of 8 mm.

6. A method for integrally joining tubular bodies such as for manufacturing bobbins as claimed in claim 1, further comprising the steps of:
axially joining in a frictional contact said female and male end sections;
inducing an axial frictional rotation of one said section against the other until melting of the adjacent surfaces of said sections occurs;
stopping the said rotation and
maintaining the said sections in a pressurized contact for the duration of the cooling time of the melted thermoplastic until solidification with a safe fusion occurs.

7. A method for integrally joining tubular bodies such as for manufacturing bobbins as claimed in claim 1,
the inner radial edges of said shoulder of both sections being bevelled to mate with each other.

8. A method for integrally joining tubular bodies such as for manufacturing bobbins as claimed in claim 1,
the angle of the shoulders to the walls of said sections being 45°.

9. A method for integrally joining tubular bodies such as for manufacturing bobbins as claimed in claim 1,
said shoulders and said frusto-conical protrusion of said male section and said frusto-conical hollow surface of said female section having rough surfaces to improve their frictional contact.

10. A method for integrally joining tubular bodies such as for manufacturing bobbins as claimed in claim 1,
said pocket having a volume sufficient to hold the melted overflow plastic.

11. A method for integrally joining tubular bodies such as for manufacturing bobbins as claimed in claim 1,
said thermoplastics being selected from a group consisting of polyamides, polyacetals, polyesters, polypropylene and polystyrene.

12. A method for integrally joining tubular bodies such as for manufacturing bobbins as claimed in claim 2, in which the number of revolutions of the rotating section and the gauge pressure between the two sections measured by the oil pressure are 1,200/r.p.m. to 1,700/r.p.m. and 30 kg/cm$^2$ to 40 kg/cm$^2$ respectively, and the outside diameter of the body ranges from diameter 66 m/m to 100 m/m.

13. A method for integrally joining tubular bodies such as for manufacturing bobbins as claimed in claim 2, in which the number of revolutions of the section and the gauge oil pressure are 1,700/r.p.m. to 2,700/r.p.m. and 15 kg/cm$^2$ to 30 kg/cm$^2$ respectively and the outside diameter of the section body is smaller than 65 diameter m/m.

14. A method for integrally joining tubular bodies such as for manufacturing bobbins as claimed in claim 1, wherein 20% to 50% of glass fiber is mixed in said thermoplastic.

15. A method for integrally joining tubular bodies such as for manufacturing bobbins as claimed in claim 1,
one of said sections being provided at its end opposite to said tubular end with a flanged section having means for engagement with a rotating spindle of a sections-combining machine.

16. A method for integrally joining tubular bodies such as for manufacturing bobbins as claimed in claim 15, wherein a plurality of small holes is formed on the outside circumference of the flange, a plurality of ribs is formed on the inner diameter surface of the cylindrical section and a section of a small radius is provided at an end edge of an opening of the respective sections.

17. A method for integrally joining tubular bodies such as for manufacturing bobbins as claimed in claim 15,
one of said sections being provided at each end with a male and female section, respectively, as a central section;
said flanged sections, each provided at its end opposite the flange with an end of opposite sex to the sex-ends of said central section,
further comprising the step of assembling said two flanged sections with said central section, producing frictional rotation between them until melting and subsequently solidifying of the sections into an integral impact and tangential strain-resistant bobbin occurs.

18. A method for integrally joining tubular bodies such as for manufacturing bobbins as claimed in claim 16, in which said flanged sections have outside ends opposite the flange ends formed with a substantially small radius;
the central section having two outside ends of two tapered male surfaces formed with a substantially small radius so as to match with the said small radius of the adjoining flanged sections when the said female tapered sections receive the said tapered male surfaces thereinto, less tapered surfaces than the foregoing tapered male surfaces being provided outwardly on the extension of the said tapered male surfaces.

19. A method for integrally joining tubular bodies such as for manufacturing bobbins as claimed in claim 16,
one of said tapered male surfaces of the central section being positioned so as to match with the tapered female surface of the first section,
one of said flanged sections being rotated under pressure so as to press the tapered surface of the non-revolving section onto the tapered surface of the revolving section until
the fusing temperature for the thermoplastic is being produced on the entire tapered surface of both sections by the rotational friction and pressure,
the rotation of the said section being stopped when the contacting surfaces of both sections are fused with each other, the pressure being maintained until the fused plastic solidifies and released after a cooling time elapses, subsequently
the other tapered male surface of the central section already combined with one flanged section being aligned to match the tapered female surface of the other, the second flanged section,
the second flanged section being combined with the other end of the central section, already joined with the first flanged section, in the same manner as the first flanged section.

20. The bobbin made by the process of claim 18.

* * * * *